United States Patent [19]

Oliver et al.

[11] Patent Number: 4,496,882
[45] Date of Patent: Jan. 29, 1985

[54] INDUCTORLESS PINCUSHION CORRECTION CIRCUIT

[75] Inventors: Kirk D. Oliver, Glendale Heights; David A. Wolff, St. Charles, both of Ill.

[73] Assignee: Motorola, Inc., Schaumburg, Ill.

[21] Appl. No.: 446,529

[22] Filed: Dec. 3, 1982

[51] Int. Cl.³ .............................................. H01J 29/56
[52] U.S. Cl. .................................................... 315/371
[58] Field of Search ................................ 315/370, 371

[56] References Cited

U.S. PATENT DOCUMENTS

| | | |
|---|---|---|
| 2,880,358 | 3/1959 | Parker . |
| 3,968,403 | 7/1976 | Ogawara ............................ 315/371 |
| 4,039,899 | 8/1977 | Battjes et al. ....................... 315/371 |
| 4,048,544 | 9/1977 | Haferl . |
| 4,101,814 | 7/1978 | Haferl ................................. 315/371 |
| 4,169,988 | 10/1979 | Fecht . |
| 4,305,023 | 12/1981 | Willis . |
| 4,346,327 | 8/1982 | Barten . |

Primary Examiner—Theodore M. Blum
Attorney, Agent, or Firm—James W. Gillman; James S. Pristelski; Margaret Marsh Parker

[57] ABSTRACT

An internally generated raster scanning circuit includes self correction for pincushion distortion by multiplying the horizontal parabolic wave form by the vertical sawtooth wave form. The multiplier is biased to provide the required 180° phase shift at the midpoint of the waveform. The multiplied signals are coupled back to an input of the existing power amplifier and a corrected current is then supplied to the vertical yoke coil, requiring no added reactor transformer. The balance or ratio of the top and bottom correction currents can be adjusted as required by a simple control in the multiplier circuit.

5 Claims, 4 Drawing Figures

INDUCTORLESS PINCUSHION CORRECTION CIRCUIT

BACKGROUND OF THE INVENTION

This invention relates to the field of CRT devices and, more particularly, to the correction of pincushion distortion in such a device.

In an electromagnetically deflected cathode ray tube, the sine of the deflection angle is proportional to the deflection current. Therefore, an undistorted rectangular pattern appears on the screen of a tube only when the radius of curvature is equal to the length of the beam, measuring from the center of the deflection plates. Since most-present day CRT face plates are flat, or nearly so, a so-called "pincushion" distortion occurs, meaning that the corners of the raster are stretched out. Due to the aspect ratio of the raster, there can be theoretically 1.33 times as much distortion along the top and bottom edges as there is along the sides. Distortion may also be different at the top and bottom of one CRT due to minor misalignment of the yoke for convergence purposes. In some CRT devices, pincushion distortion is partially prevented by special design of the yoke winding and, in black and white tubes, the yoke design may correct it sufficiently. In color CRT's, however, this method may cause degradation of the spot size and convergence and thus reduce resolution at the corners of the screen. This effect is particularly undesirable in the use of the CRT's used in data terminals, as resolution must be of high quality over the entire screen. Another correction method involves the use of an extraneous electrostatic or electromagnetic field in the area between the yoke and the screen. Spot distortion with this method can be minimized by placing the field close to the screen. A better approach is to decrease the rate of change of sweep circuit current as it approaches its peak values. This latter method can produce satisfactory results, but the current function is not a simple one to provide and the typical implementation requires a reactor transformer and power drive circuitry at considerable added expense.

SUMMARY OF THE INVENTION

It is, therefore, an object of the present invention to provide pincushion (geometric) correction for a cathode ray tube.

It is a particular object to provide correction for a three-gun, raster-scanned tube with relatively inexpensive circuitry.

It is another object to provide pincushion correction for a non-symmetrical raster as necessary.

These objects and others which will be apparent are achieved in a circuit in accordance with the invention wherein the saw-tooth wave form of the vertical yoke current is multiplied by the horizontal parabolic wave form in a balanced modulator circuit. Bias is set to overmodulate the carrier (horizontal parabola), inverting the phase by 180° and providing the change of polarity of the correction from top to bottom. A portion of the multiplier circuit is controllable on a set-to-set basis to allow for correcting non-symmetrical pincushion distortion as needed. The combined signal is coupled back to the power amplifier which feeds the vertical yoke coil, thus requiring no added reactor transformer.

DETAILED DESCRIPTION OF A PREFERRED EMBODIMENT

Figure 1:
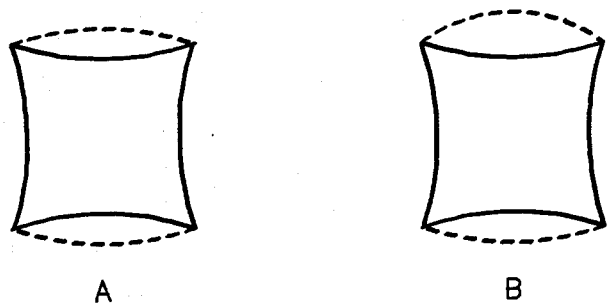
FIGS. 1a and 1b are charts of CRT screens illustrating symmetrical and unsymmetrical pincushion distortion of rasters.

The diagrams of FIGS. 1a and 1b illustrate two possible types of pincushion distortion and the required compensating or correcting voltages (dashed lines). As described above, this distortion can be due to the fact that, with magnetic deflection, a rectangular pattern would be undistorted only on a screen whose radius of curvature equals the "pencil length" or the length of the deflected beam or beams. If the screen is flat or nearly so, the "pincushion" effect appears and must be corrected, at least across the top and bottom of the raster. If the distortion is symmetrical, top and bottom distortion correction can be balanced, as in FIG. 1a however, due to other factors such as misalignment of the yoke for convergence purposes, the distortion may be appreciably unsymmetrical, as in FIG. 1b. Therefore, any correction scheme should provide the capability for balancing the amount of correction between top and bottom of the raster.

Therefore, the present invention will be described in the environment of top and bottom correction only, although the principle is not limited thereto.

Figure 2:
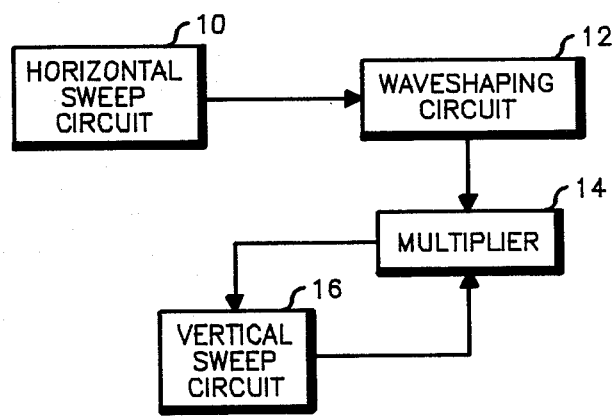
FIG. 2 is a block diagram of the circuit of the invention.

FIG. 2 is a simplified block diagram of the system illustrating the interconnections of a horizontal sweep circuit 10, a wave shaping circuit 12, a multiplier 14 and a vertical sweep circuit 16.

Figure 3:
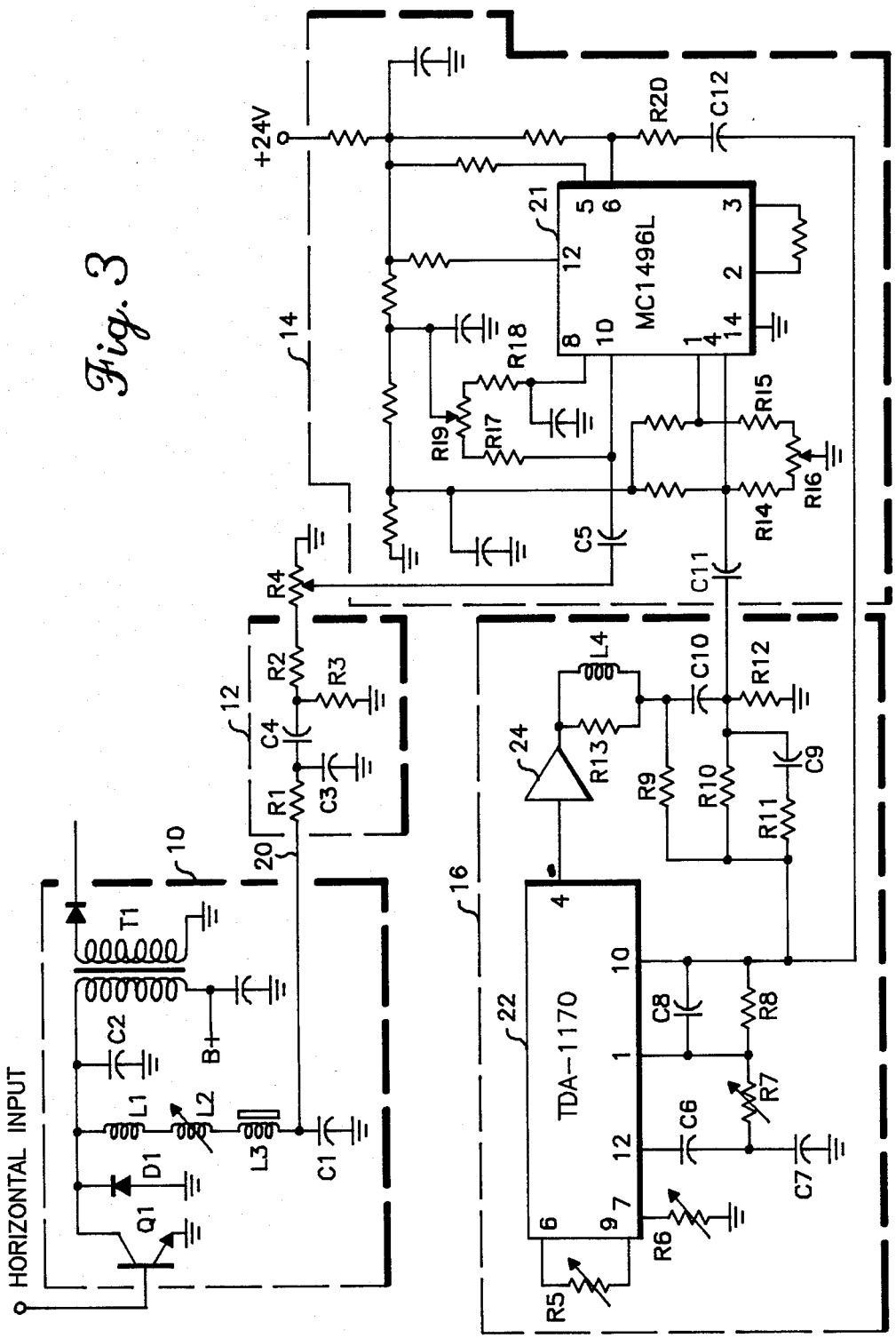
FIG. 3 is the schematic diagram of the circuit of the invention.

FIG. 3 is a preferred embodiment of the schematic diagram for the circuit corresponding to the diagram of FIG. 2. The horizontal sweep circuit 10 includes a horizontal output transistor Q1, a damper diode D1, a horizontal yoke coil L1, an adjustable width coil L2, a horizontal linearity coil L3, an "S" capacitor C1, a retrace capacitor C2, and a flyback transformer T1. The horizontal sweep circuit 10 operates substantially as is known in the art and is coupled to the wave shaping circuit 12 by a line referenced as 20. The circuit 12 may comprise resistors R1, R2, R3 and capacitors C3, C4. In the circuit 12, the parabolic signal from line 20 is filtered to clean up the waveform and the phase is adjusted as required for the multiplication process to follow. The output of the wave shaping circuit 12 is coupled through a pincushion correction level control R4 to the multiplier 14, specifically through a capacitor C5 to one input (pin 10) of the upper quad differential amplifier in an IC 21 which is a monolithic balanced modulator-demodulator such as the Motorola MC1596/1496.

The vertical sweep circuit 16 includes an IC 22 which may be one designed for use in vertical deflection circuits and known as the TDA1170, manufactured by SGS-ATES. The IC 22 includes a sync circuit, oscillator, ramp generator, buffer stage, preamplifier, power amplifier, flyback generator and voltage generator. Coupled across the oscillator terminals (pins 6, 9) is a variable frequency control R5. A vertical size control R6 is coupled from a ramp terminal (pin 7) to ground. A vertical linearity control R7 is coupled from the buffer output terminal (pin 1) to the midpoint of capacitor pair C6, C7, which are coupled from a ramp generator output terminal (pin 12) to ground. A capacitor C8 and resistor R8 are coupled in parallel from the buffer output terminal (pin 1) to the preamplifier input terminal (pin 10). Also coupled to the preamplifier input terminal is a negative feedback network consisting of R9, R10, R11 and C9. This network is coupled to a vertical yoke coupling capacitor C10 and yoke current sampling resistor R12. The output terminal (pin 4) of the IC 22 is coupled to an off-chip power amplifier 24 whose output supplies a vertical yoke coil L4. A yoke damping resistor R13 is coupled across the vertical yoke, and the lower end of the yoke coil and the resistor R13 are coupled to resistor R9 and capacitor C10. The midpoint of resistor R12 and capacitor C10 is coupled through a capacitor C11 to an input terminal (pin 4) of the lower differential amplifier in the IC 21. Coupled across the inputs (pins 1, 4) of the lower differential amplifier is a balancing network consisting of R14, R15 and variable R16, the tap of R16 going to ground. This network provides the balance between the top and bottom pincushion correction as will be discussed hereinafter. A second balancing network consisting of resistors R17, R18 and variable resistor R19 is coupled across the input terminals (pins 8, 10) of the upper quad differential amplifier in the IC 21 for balancing the amplifier inputs. Balanced overmodulation is necessary here to obtain the 180 degree phase reversal at the center of the raster, providing positive correction for the top of the raster and negative correction at the bottom. The multiplied signals at one of the output terminals (pin 6) of the IC 21 are then coupled back through a resistor R20 and capacitor C12 to the summing node (pin 10 of IC 22) at the input of the preamplifier. The power amplifier then outputs to the vertical yoke L4 a "corrected" current wave form which is increased slightly in the center of the horizontal trace at the top of the raster, unchanged across the middle of the raster, and decreased in the center at the bottom of the raster. If the distorton is not equal on top and bottom, the balance can be adjusted by means of balance control R16 in the multiplier 14. If this adjustment introduces an error into the vertical linearity of the scan, the error can be corrected by means of the linearity control R7.

Thus, there has been shown and described a relatively simple arrangement for providing pincushion correction for a CRT. The circuit uses the existing power amplifiers and does not require an added reactor transformer. It also allows for correction of nonsymmetrical distortion as needed. Other variations and modifications of the present invention are possible and it is intended to cover all such as fall within the spirit and scope of the appended claims.

What is claimed is:

1. A CRT raster scanning circuit with pincushion correction and comprising:
   first scanning means for providing a first raster scanning signal at a first frequency, said first scanning signal having the form of a parabolic segment;
   wave shaping means coupled to receive said first raster scanning signal and including filtering means and phase adjusting means;
   level control means coupled to the output of the wave shaping means;
   first yoke means for applying said shaped and controlled parabolic scanning signal to the beam of the CRT;
   second scanning means for providing a second, sawtooth shaped raster scanning signal at a second frequency and including power amplifier means;
   second yoke means for applying said second raster scanning signal to the beam of the CRT;
   multiplier means coupled to receive and to multiply the first and second scanning signals and including a first multiplier circuit biased to provide 180 degree phase shift in the product signal, and a second multiplier circuit including control means for adjusting the balance of the product signal; and
   feedback means for coupling the product signal back to an input of the power amplifier means.

2. A CRT raster scanning circuit according to claim 1 and wherein the multiplier means includes a monolithic balanced modulator circuit.

3. A CRT raster scanning circuit according to claim 2 and wherein the first multiplier circuit is a lower differential amplifier in the modulator circuit and the second multiplier circuit is an upper quad differential amplifier in the modulator circuit.

4. A CRT raster scanning circuit according to claim 1 wherein the second scanning means includes a monolithic integrated circuit for receiving a vertical sync input signal and for providing the functions of an oscillator, a voltage ramp generator, a high power gain amplifier and a flyback signal generator.

5. A CRT raster scanning circuit according to claim 4 and wherein the second scanning means further includes a second high power gain amplifier coupled between the monolithic integrated circuit output and the second yoke means.

* * * * *